(12) United States Patent
Adams et al.

(10) Patent No.: US 8,355,701 B2
(45) Date of Patent: *Jan. 15, 2013

(54) DISPLAY OF SECURE MESSAGES ON A MOBILE COMMUNICATION DEVICE

(75) Inventors: Neil P. Adams, Waterloo (CA); Michael S. Brown, Waterloo (CA); Herbert A. Little, Waterloo (CA); Michael K. Brown, Kitchener (CA)

(73) Assignee: Research In Motion Limited, Waterloo (CA)

( * ) Notice: Subject to any disclaimer, the term of this patent is extended or adjusted under 35 U.S.C. 154(b) by 31 days.

This patent is subject to a terminal disclaimer.

(21) Appl. No.: 12/946,632

(22) Filed: Nov. 15, 2010

(65) Prior Publication Data

US 2012/0122425 A1 May 17, 2012

Related U.S. Application Data

(63) Continuation of application No. 11/291,178, filed on Nov. 30, 2005, now Pat. No. 7,840,207.

(51) Int. Cl.
*H04L 12/58* (2006.01)
*H04M 1/725* (2006.01)
*H04M 1/663* (2006.01)

(52) U.S. Cl. ............ 455/412.1; 455/410; 455/411; 455/414.1; 455/418; 455/466; 370/310.2; 370/312; 370/328

(58) Field of Classification Search .......... 455/410–411, 455/414.1, 418, 466, 412.1; 370/310.2, 312, 370/328

See application file for complete search history.

(56) References Cited

U.S. PATENT DOCUMENTS

| | | | |
|---|---|---|---|
| 4,028,500 | A | 6/1977 | McClure et al. |
| 5,410,602 | A | 4/1995 | Finkelstein et al. |
| 5,457,748 | A | 10/1995 | Bergum et al. |
| 5,647,002 | A | 7/1997 | Brunson |
| 5,666,530 | A | 9/1997 | Clark et al. |
| 5,754,778 | A | 5/1998 | Shoujima |
| 5,812,671 | A | 9/1998 | Ross |
| 6,061,448 | A | 5/2000 | Smith et al. |
| 6,073,237 | A | 6/2000 | Ellison |

(Continued)

FOREIGN PATENT DOCUMENTS

EP 0500245 8/1992

(Continued)

OTHER PUBLICATIONS

Examination Report dated Dec. 17, 2010 from CA2568361.

(Continued)

*Primary Examiner* — Steve D Agosta
(74) *Attorney, Agent, or Firm* — Jenna L. Wilson; Dimock Stratton LLP

(57) ABSTRACT

A mobile communications device for the display of an incrementally received message includes a message viewer application for scanning the received portions of the message. On determination that the received portion of the message includes a first displayable portion of the message content, the system signals to a message server to halt the message server from forwarding further portions of the message content. The system provides a mechanism for the user of the mobile communications device to cause the mobile communications device to further signal the message server to recommence the forwarding of further portions of the secure message content to permit the verification of the e-mail based on the further portions of the secure message content.

22 Claims, 5 Drawing Sheets

U.S. PATENT DOCUMENTS

| | | | |
|---|---|---|---|
| 6,081,601 | A | 6/2000 | Raivisto |
| 6,084,969 | A | 7/2000 | Wright et al. |
| 6,085,323 | A | 7/2000 | Shimizu et al. |
| 6,119,228 | A | 9/2000 | Angelo et al. |
| 6,219,694 | B1 | 4/2001 | Lazaridis et al. |
| 6,229,894 | B1 | 5/2001 | Van Oorschot et al. |
| 6,266,420 | B1 | 7/2001 | Langford et al. |
| 6,289,105 | B1 | 9/2001 | Murota |
| 6,616,038 | B1 | 9/2003 | Olschafskie et al. |
| 6,661,927 | B1 | 12/2003 | Suarez et al. |
| 6,684,088 | B1 | 1/2004 | Halahmi |
| 6,779,115 | B1 | 8/2004 | Naim |
| 6,829,357 | B1 | 12/2004 | Alrabady et al. |
| 6,868,274 | B1 | 3/2005 | Ayabe et al. |
| 6,904,521 | B1 | 6/2005 | Jivsov |
| 6,918,038 | B1 | 7/2005 | Smith et al. |
| 6,925,568 | B1 | 8/2005 | Heinonen |
| 6,983,367 | B2 | 1/2006 | Go et al. |
| 6,993,137 | B2 | 1/2006 | Fransdonk |
| 7,020,708 | B2 | 3/2006 | Nelson et al. |
| 7,113,927 | B1 | 9/2006 | Tanaka et al. |
| 7,113,976 | B2 | 9/2006 | Watanabe |
| 7,127,604 | B2 | 10/2006 | Lide et al. |
| 7,143,181 | B2 | 11/2006 | Koka et al. |
| 7,171,552 | B1 | 1/2007 | Bell |
| 7,196,807 | B2 | 3/2007 | Goldstone |
| 7,228,418 | B1 | 6/2007 | Girault |
| 7,254,712 | B2 | 8/2007 | Godfrey et al. |
| 7,392,547 | B2 | 6/2008 | Cahill et al. |
| 7,529,374 | B2 | 5/2009 | Huttunen |
| 2001/0046307 | A1 | 11/2001 | Wong |
| 2002/0007453 | A1 | 1/2002 | Nemovicher |
| 2002/0032861 | A1 | 3/2002 | Azuma |
| 2002/0035687 | A1 | 3/2002 | Skantze |
| 2002/0059383 | A1 | 5/2002 | Katsuda |
| 2002/0099727 | A1 | 7/2002 | Kadyk et al. |
| 2003/0172122 | A1 | 9/2003 | Little et al. |
| 2003/0196098 | A1 | 10/2003 | Dickinson et al. |
| 2003/0198350 | A1 | 10/2003 | Foster et al. |
| 2003/0236864 | A1 | 12/2003 | Lai |
| 2004/0083364 | A1 | 4/2004 | Andreaux et al. |
| 2004/0249892 | A1 | 12/2004 | Barriga et al. |
| 2005/0114671 | A1 | 5/2005 | Little et al. |
| 2005/0163320 | A1 | 7/2005 | Brown et al. |
| 2005/0188219 | A1 | 8/2005 | Annicet et al. |
| 2005/0210289 | A1 | 9/2005 | Brown |
| 2005/0246763 | A1 | 11/2005 | Corcoran et al. |
| 2006/0036865 | A1 | 2/2006 | Brown et al. |
| 2006/0272006 | A1 | 11/2006 | Wei et al. |
| 2007/0118874 | A1 | 5/2007 | Adams et al. |
| 2007/0123307 | A1 | 5/2007 | Adams et al. |
| 2007/0165844 | A1 | 7/2007 | Little et al. |

FOREIGN PATENT DOCUMENTS

| | | | |
|---|---|---|---|
| EP | 0841770 | A | 5/1998 |
| EP | 1096725 | A2 | 5/2001 |
| EP | 1096727 | A2 | 5/2001 |
| EP | 1580953 | | 9/2005 |
| EP | 1806683 | | 7/2007 |
| JP | 7-509333 | | 10/1995 |
| JP | 8-251221 | | 9/1996 |
| JP | 10-022992 | | 1/1998 |
| KR | 1020030059303 | | 7/2003 |
| WO | 96/36934 | A1 | 11/1996 |
| WO | 97/41661 | A | 11/1997 |
| WO | 98/34374 | A | 8/1998 |
| WO | 99/05814 | | 2/1999 |
| WO | 99/06900 | | 2/1999 |
| WO | 99/27678 | A2 | 6/1999 |
| WO | 0031931 | A1 | 6/2000 |
| WO | 00/69114 | A | 11/2000 |
| WO | 00/72506 | A1 | 11/2000 |
| WO | 01/24434 | A | 4/2001 |
| WO | 01/78491 | A2 | 10/2001 |
| WO | 03/005636 | | 1/2003 |

OTHER PUBLICATIONS

Stallings, W.: "Simime: E-Mail Gets Secure". Byte, McGraw-Hili Inc., St. Peterborough, US, vol. 23, No. 7, Jul. 1998, pp. 41-42, XP000774260.

Crocker S. et al.: MIME Object Security Services; rfc1848.textM. IETF Standard, Internet Engineering Task Force, IETF, CHI Oct. 1995, XP015007633.

Katsuro Inaya, et al., "Use Windows CE Now", ASCII, Oct. 1, 1999, vol. 23, No. 10, pp. 266-285.

Hiroyuki Sawano, Create a Secure Electronic Mail Environment with SIMIME!, @IT Security & Trust, May 30, 2001, URL. http://www.atmarkit.co.jp/fsecurity/special/O4smime/smimeOI.html.

Blom et al. "Conversational IP Multimedia Security", 4th International Workshop on Mobile and Wireless Communications Network, 9-1 Sep. 1, 2002, pp. 147-151.

Fumy et at. Principles of Key Management, IEEE Journal on Selected Areas in Communications, VDI, 11, No. 5, Jun. 1999, pp. 785-793.

Eskicioglu et at. "A Key Transport Protocol Based on Secret Sharing Applications to Information Security", IEEE Transactions on Consumer Electronics, vol. 46, No. 4, Nov. 2002, pp. 816-824.

Kotzanikoloau et al. "Hybrid Key Establishment for Multiphase Self-organized Sensor Networks", 6' IEEE International Symposium on a World of Wireless Mobile and Multimedia Networks, Jun. 13-16, 2005, pp. 581-587.

Research in Motion Limited, Blackberry Security White Paper Release 4.0. 2005 Internet Address: http://blackberry.comIknowledgecenterpublicIlivelink.exe?func=II&objId=S2SO44&objAction=browse&sort=name.

Policht, Martin, Sal Server 2005 Security—Part 3 Encryption, Database Journal Internet Address: http://www.databasejournal.com/features/mssql/article.php/34S3931.

Encrypt Pre-shared Keys in Cisco 10s Router Configuration Example, Document 1 D 46420 Cisco Systems, Internet Address: htto:/lwww.cisco.com/en/US/tech/tk5S3/tk3721t echnologies~configuration~example09186a008f021336.shtml.

Dusse Etal.: "SIMIME Version 2 Certificate Handling," Database IETF RFC Online IETF; RFC 2312, 0311998, pp. 1-20 (Chapter 2.1, Chapter 4.1), XP002220385.

Hoffman: "Enhanced Services for SIMIME," Database IETF RFC Online IETF; RFC 2634, 0611999, pp. 1-58 (Chapter 3, pp. 24-32), XP002220386.

Gong et al.: "Multicast Security and its Extension to a Mobile Environment," SRI International, Computer Science Laboratory, J.C. Baltzer AG, Science Publishers, Wireless Networks 1 (1995) pp. 281-295.

Torvinen, V.: "Wireless PKI: Fundamentals," Internet Article, Radicchio White Paper, 'Online! 2000, pp. 12-13, XP002223159.

Kiely, Don, Sal Server 2005 Secures Your Data Like Never Before, Sep. 29, 2005. Internet Address: http://www.devx.comlcodemaglArticle/29351?trk=DXESS DB.

Dusse Etal.: "SIMIME Version 2 Certificate Handling," Database IETF RFC Online IETF; RFC 2312, 0311998, pp. 1-20 (Chapter 2.1, Chapter 4.1), XP002220385, pub dates is Mar. 11, 1998.

Hoffman: "Enhanced Services for SIMIME," Database IETF RFC Online IETF; RFC 2634, 0611999, pp. 1-58 (Chapter 3, pp. 24-32), XP002220386, pub date is Jun. 11, 1999.

Schumacher: "AutoPGP FAQ, Version 1," Internet Newsgroup, 'Online! (Apr. 19, 1994), XP002230742.

Levien: "Protecting Internet E-Mail From Prying Eyes," Data Communications, McGraw Hill, New York, US, vol. 25, No. 6 (May 1, 1996), pp. 117-118, 120, 122, XP 000587586.

Syverson: "Limitations on Design Principles for Public Key Protocols," Security and Privacy, 1996, Proceedings, 1996 IEEE Symposium on Oakland, CA, USA, May 6-8, 1996, Los Alamitos, CA, USA, IEEE Comput. Soc., US, pp. 62-72, XP010164926.

Lai, M.K.E., et al.: "A Mobile Subscriber Proxy Preserving Writer-to-Reader Message Security," Military Communications Conference, 1996, Milcolm '96, Conference Proceedings, IEEE McLean, VA, USA, Oct. 21-24, 1996, New York, NY, USA, IEEE, US, pp. 461-467, XP010203896.

Cole, R., et al.: "An Architecture for a Mobile OSI Mail Access System," IEEE Journal on Selected Areas in Communications, IEEE Inc., New York, US, vol. 7, No. 2, Feb. 1989, pp. 249-256, XP000904914.

Harris, A.: "Content Privacy and Content Security Working Together," Internet Article, Content Technologies White Paper, 'Online! Sep. 1999, pp. 8-9, XP002223158.

Mambo, M., et al.: "Proxy Signatures: Delegation of the Power to Sign Messages," IEICE Transactions on Fundamentals of Electronics, Communications and Computer Sciences, IEICE Tokyo, JP, vol. E79-A, No. 9, Sep. 1, 1996, pp. 1338-1353, XP000679624.

Brown, M., et al.: "PGP in Constrained Wireless Devices," Proceedings of the 9th Usenix Security Symposium, Denver, CO, Aug. 14-17, 2000, XP002210575.

Brown, I., et al.: "A Proxy Approach to E-Mail Security," Software Practice & Experience, John Wiley & Sons Ltd., Chichester, GB, vol. 29, No. 12, Oct. 1999, pp. 1049-1060, XP000852351.

Sybramanyam, V., et al.: "Security in mobile systems," Reliable Distributed Systems, 1998 Proceedings, 17th IEEE Symposium on W. Lafayette, IN, USA, Oct. 20-23, 1998, Los Alamitos, CA, USA, IEEE Comput. Soc., US, pp. 407-412, XP010319125.

DISPLAY OF SECURE MESSAGES ON A MOBILE COMMUNICATION DEVICE

REFERENCE TO PRIOR APPLICATIONS

This application is a continuation of U.S. application Ser. No. 11/291,178, filed Nov. 30, 2005, now U.S. Pat. No. 7,840,207, the entirety of which is incorporated herein by reference.

TECHNICAL FIELD

This invention relates generally to the display of messages on mobile communication devices, and particularly to the display of secure messages on such devices.

TECHNICAL BACKGROUND

Mobile communication devices with display screens are used to receive and display electronic messages in text or graphical format. It is desirable for such devices to display received messages, such as e-mail messages, to users without excessive delay in new information being displayed on the screens of the devices.

However, it is common for electronic messages to include more information than that which will typically be displayed by a mobile communication device. For example, an e-mail message as sent may repeat the body of the message several times in different formats. It is common for the same content to be included in plaintext format, in rich text format and in HTML (hypertext markup language) format. At the mobile communication device, it is typically only appropriate to display the message body in one of the possible formats. Often, for reasons of efficiency, only the plaintext version of the message body will be displayed.

Where a user employs a mobile communications environment in which messages are forwarded to the device from a message server, the server may be configured to send only a single version of the message body to the mobile communications device. This provides efficiencies in the communication to the mobile communication device. From the perspective of the user of the device, such an approach will reduce the time that would otherwise have been taken for the mobile communications device to receive, process and redraw the screen as required by the device operation when in receipt of the differently formatted information.

However, this approach may not be available when mobile communication devices are configured to receive messages that are sent in accordance with a secure message format such as the Secure Multipurpose Internet Mail Extension (S/MIME) format. For such messages to be verified by a mobile communication device, it is often required that the entire message (or a significant portion of the message) be received by the device. However, where differently formatted message body information is repeated in the message, the secure message will include more data than will be displayed by the mobile communication device. As a result, the user of the device may experience undesirably slow performance while the device carries out processing steps relating to the data that is not displayed to the user but which steps are carried out as the device receives the information necessary to enable the message to be verified by the device.

Accordingly, it is desirable to provide a system and method for the display of secure messages on a mobile communications device in which a secure message may be received and displayed by the device without causing undue delays in message display.

DETAILED DESCRIPTION

Figure 1:
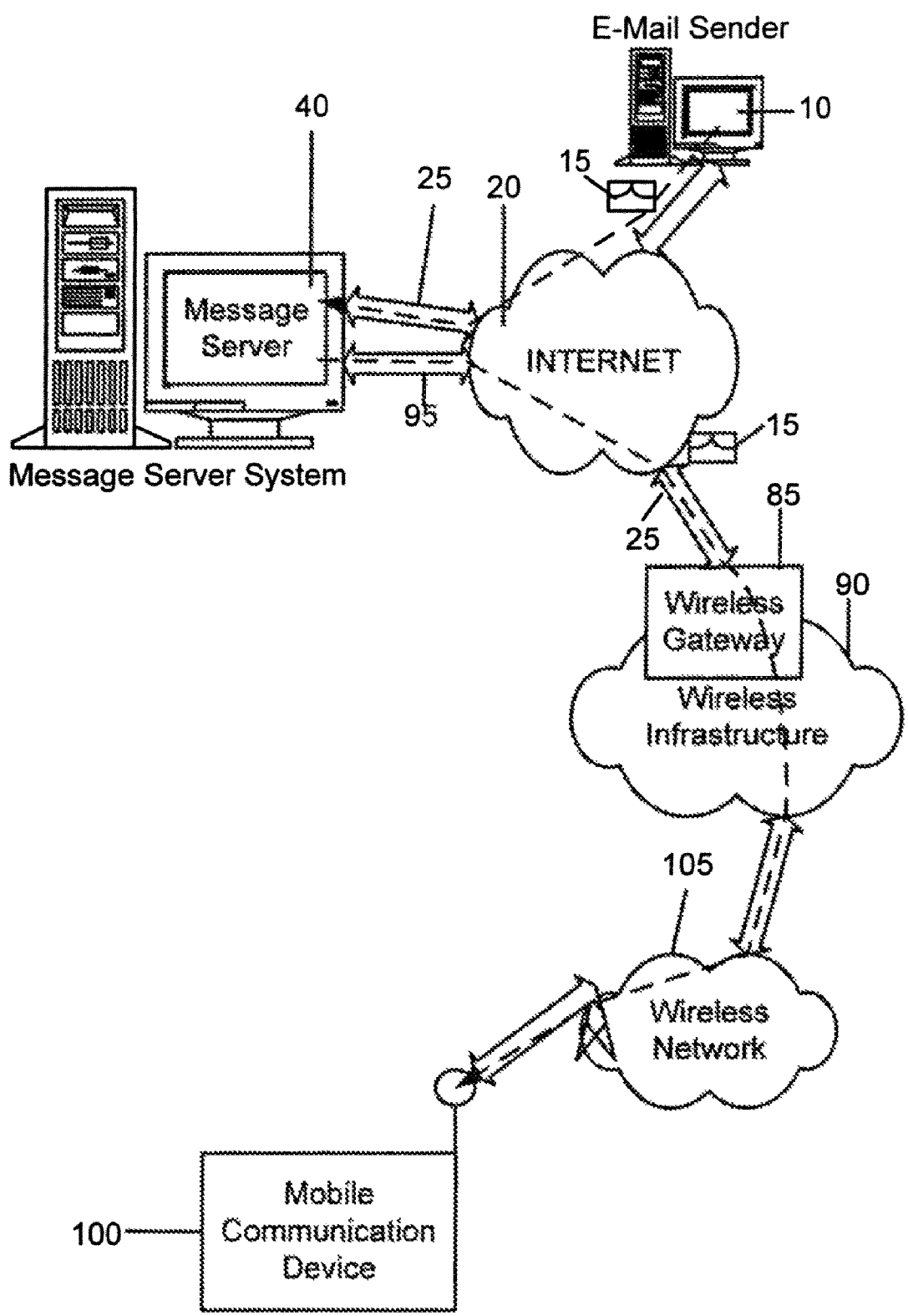
FIG. 1 is an overview of an example communication system in which a wireless communication device may be used.

Accordingly, a system on a mobile communications device is provided for the display of an incrementally received secure message. The system includes a message viewer application for scanning the received portions of the message. On determination that the received portion of the message includes a first displayable portion of the message content, the system signals to a message server to halt the message server from forwarding further portions of the message content. The system further provides a mechanism for the user of the mobile communications device to cause the mobile communications device to further signal the message server to recommence the forwarding of further portions of the secure message content to permit the verification of the e-mail based on the further portions of the secure message content.

Advantages include improved display performance for the user of a mobile communications device due to the halt in information being received from the message server where the mobile device will process, but not display, the information that would otherwise be initially received by the mobile communications device. However, the user remains able to carry out a security verification of the received message at the mobile communications device.

The invention in one aspect comprises a method for receiving a message on a mobile communications device, the message comprising a displayable message content portion capable of being viewed on the mobile communications device, the end of the displayable message content portion being identified by a predefined indicator, the method comprising the steps of: receiving a first segment of the message; scanning the first segment for the predefined indicator; if the predefined indicator is not found within the first segment, automatically receiving a further segment of the message; and scanning the further segment of the message for the predefined indicator.

In another aspect, the invention comprises a method for receiving a message on a mobile communications device, the message comprising a displayable message content portion capable of being viewed on the mobile communications device, the end of the displayable message content portion being identified by a predefined indicator, the method comprising the steps of: receiving a first segment of the message; scanning the first segment for the predefined indicator; if the predefined indicator is not found within the first segment, automatically receiving a further segment of the message; and scanning the further segment of the message for the predefined indicator, wherein the first and any further segment is transmitted to the mobile communications device by a server, the method further comprising the step of automatically transmitting a command to the server to transmit a further segment of the message, said step of transmitting a command being executable at any time during the method.

In a further aspect, the invention comprises a computer program product comprising code operative to carry out the steps of any of the aforesaid methods.

In a further aspect, the invention comprises a system for the display of a message receivable on a mobile communications device to a user, the message being automatically incrementally forwarded in segments to the mobile communications device by a message server, the message comprising a message content portion displayable on the mobile communications device, the system comprising: means adapted to scan received segments of the message to determine if the entirety of a first displayable portion of the message has been received by the mobile communications device; and means adapted to signal the message server to prevent the automatic incremental forwarding of segments of the message on the determination that the entirety of a first displayable portion has been received.

FIG. 1 is an overview of an example communication system in which a wireless communication device may be used. One skilled in the art will appreciate that there may be other different topologies, but the system shown in FIG. 1 helps demonstrate the operation of the secure message processing systems and methods described in the present application. There may also be many message senders and recipients. The simple system shown in FIG. 1 is for illustrative purposes only.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are known to those skilled in the art. The message 15 arrives at the message server 40 and is normally stored in a message store. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
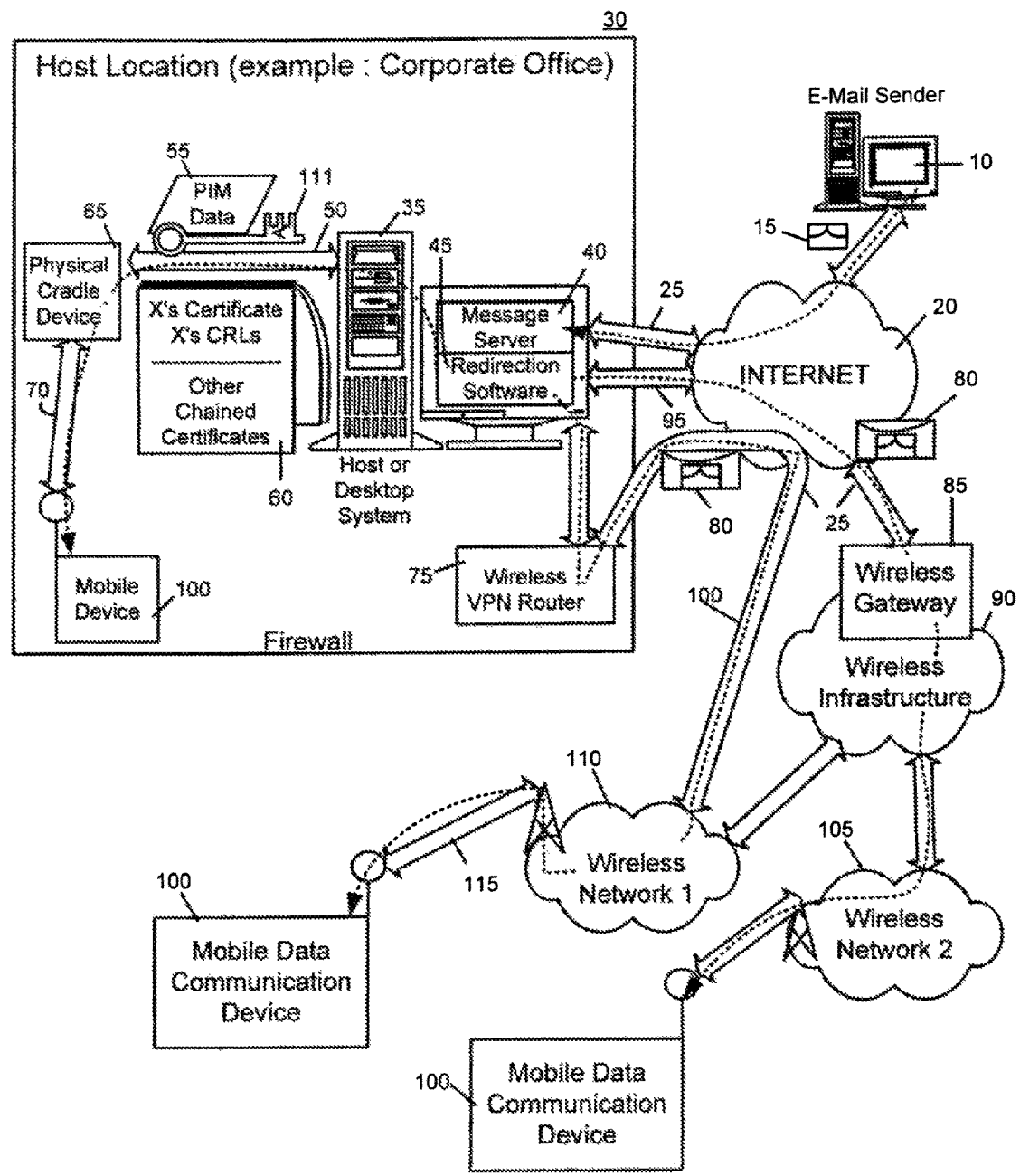
FIG. 2 is a block diagram of a further example communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on a computer within the firewall of the host system that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 Patent"), entitled "System and Method for Pushing Information From A Host System To A Mobile Data Communication Device Having A Shared Electronic Address", and issued to the assignee of the instant application on Apr. 17, 2001, which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. A VPN connection could be established directly through a specific wireless network 110 to a mobile device 100. The possibility of using a wireless VPN router 75 is contemplated to be used with Internet Protocol (IP) Version 6 (IPV6) on IP-based wireless networks. This protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP (Pretty Good Privacy data encryption) specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

S/MIME is a message security protocol that enables end-to-end authorization and protection of data integrity and privacy from the time that the originator sends the message until the message recipient decodes and reads the message. S/MIME allows message senders to digitally sign messages using their digital signature, encrypt messages with the recipient's public key, or both digitally sign and encrypt the message.

In the preferred embodiment an S/MIME message may be verified both at message server 40 and at mobile device 100, both shown in FIG. 2. For a user of the mobile communications device, verification at mobile device 100 provides a higher level of security than relying on the verification at message server 40. In some cases, however, the verification at message server 40 may be sufficient for the user. In mobile device 100, a verification application is executable to determine if some or all of a received message meets message security protocol requirements. The verification application executed on the mobile device 100 may decrypt the message received at the mobile device 100, or it may verify a digital signature appended to the message, or it may both decrypt and verify a digital signature, depending on whether the message received was encrypted, signed, or both signed and encrypted, respectively. If the verification application is executed at the message server 40, the verification application may still decrypt, verify the digital signature of, or both decrypt and verify the digital signature of a message received at the server 40, but the resultant decrypted message then delivered to the mobile device 100 could thus be subject to tampering undetected by the user of the mobile device 100 upon receipt of the resultant message.

In some cases, the verification application executable by mobile device 100 will be unable to complete the verification process without receipt of the entire message or a significant portion of the message. For example, where a portion of a message is digitally signed it is typical for the verification of the signature to rely on the content of that portion of the message. Thus where a portion of the message, perhaps as much as the entire message body itself, is encoded or signed in this way, this portion of the message subject to verification, as well as any digital certificate attached to the message, must be received by mobile device 100 before verification at mobile device 100 is able to be carried out. If the message to be verified comprises other file attachments, then typically all of the attachments must be received by the mobile device 100 before the verification application can verify the message.

The above operational characteristic may adversely affect the speed at which information is displayed to a user of mobile device 100. This is particularly the case where the message being received by mobile device 100 has either repeated message body contents (as where plaintext, rich text and/or HTML formatted message body versions are included) or attachments. In either case, information may be received which information is not displayable to the user or is not intended to be displayed to the user of the mobile device 100.

An approach to solving this potential adverse impact on perceived device responsiveness is for the message server 40 to edit messages being forwarded to the mobile communication device 100. Such an editing step can remove certain repeated portions of the message body. For example, if the message received at the message server 40 contains the content of the message in plaintext and in HTML, then the server 40 could strip out the HTML portion of the message before forwarding it to the mobile device 100. However, where the mobile communication device 100 executes a verification application, it will not be possible for the message server 40 itself to automatically edit messages to remove such repeated portions, since this would cause the verification step to fail.

Accordingly, the execution of a verification application by the mobile device 100 may require the device 100 to receive non-displayable or repetitive portions before verification can be accomplished, and consequently the mobile device 100 may exhibit slower than optimal display characteristics as the non-displayable or repetitive information is received and processed by mobile device 100.

Figure 4:
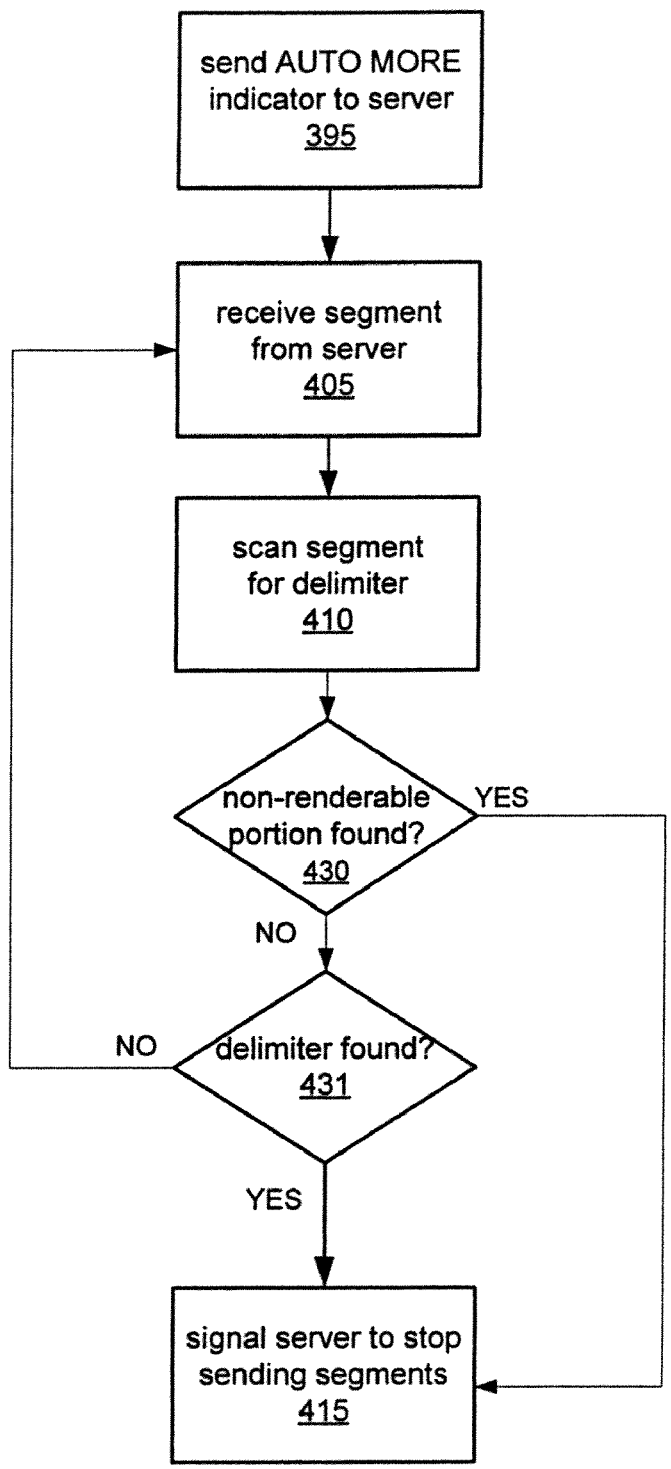
FIG. 4 is a flowchart showing the steps taken by a wireless mobile device to communicate with a message server to manage the forwarding of information to the device.

According to the preferred embodiment, however, a message viewer application for displaying messages to a user executable on the mobile communication device 100 also operates to potentially reduce the number of portions of the message that will be forwarded by the message server 40. In the preferred embodiment, mobile communication device 100 is able to communicate with the message server 40 to manage the forwarding of information to the device. As shown in FIG. 4, the message data for a first message received by the message server 40 is forwarded to the mobile communication device 100 in segments or chunks of predetermined size (for example, in segments of up to 1 kilobyte), initially with a first segment being forwarded at step 405. This first segment comprises only content that can be displayed to the user on the mobile device 100; so, for example, if the message is encrypted, the segment may be empty if the message was not previously decrypted by the message server 40. In that case, the user would see only header information for the message (e.g., the sender information, the timestamp, or the subject line) and would be advised by the message viewer application that additional content is available for downloading and verification by the verification application. Otherwise, if the message is not encrypted, the first segment sent at step 405 comprises message content.

After receipt of each segment at the mobile communication device 100, the message viewer application scans the message data received in that segment at step 410. There are two results of the segment scan at step 410 that are shown in FIG. 4. At decision step 430 (described below), the renderable nature of the segment determines future steps. At decision step 431, the presence of a delimiter determines whether a complete renderable portion of the message has been received at the mobile device 100. For example, if the message viewer application on the mobile device 100 is capable of displaying plaintext content to the user, as opposed to other formats such as Rich Text Format (RTF) or HTML, the message viewer application scans for a predetermined indicator, such as a defined boundary delimiter, that is known to define the end of plaintext content. In the preferred embodiment, the message is defined using the S/MIME protocol and therefore different parts of the message body are delimited in defined ways. For example, a plaintext portion of the message body is preceded by a defined boundary delimiter such as "--Part_Boundary_Alternative" with a content format specifier, for example, "Content-Type: text/plain". Similar content format specifiers ("Content-Type: text/html" and "Content-Type: text/RTF" for HTML and RTF format, respectively) may be found in message content portions of messages received by the mobile communication device 100. Thus, the message view application at step 410 may scan or search the received message segment for the presence of "--Part_Boundary_Alternative Content-Type: text/plain". If such a delimiter, or other predefined indicator, is found in the message segment, then the message view application may determine that it has received a complete portion of plaintext content and instructs the server 40 to cease sending further segments at step 415. If such a delimiter is not found in the message segment by the scan, then a further message segment is automatically delivered to the mobile communication device 100 by the message server 40 at step 405. The further message segment is similarly scanned or searched at step 410, and yet a further message segment is automatically delivered at step 405 from the message server 40 if the delimiter is not found. At any time during this process, the user of the mobile communication device 100 may view the segments of the message that have already been downloaded to the mobile device 100.

Thus, in the preferred embodiment, the scan carried out by the message viewer application parses the incoming message segments to determine whether a first set of plaintext information has been received. In preferred embodiment given above, the delimiters are defined in accordance with Request for Comment 2046 (RFC 2046), which describes MIME alternate encodings of message text. In particular, section 5.1.4 of RFC 2046 describes the inclusion of alternative parts in "order of increasing faithfulness to the original content". In practice in accordance with this order of increasing faithfulness, the most simple encoding (typically plaintext) is included in the message prior to other encodings (HTML and Rich Text, for example). Thus, by following the method outlined above, a complete portion of plaintext content may be downloaded without user intervention, and without downloading message segments comprising exclusively non-displayable or repetitive information to the mobile device 100.

In the preferred embodiment, the automatic delivery of the further segments with each repeated execution of step 405 is controlled by a command referred to here as the AUTO MORE command. Preferably, the AUTO MORE command is specified by the mobile communication device 100 by default, although it may be manually specified by the user. When the default, or user-specified, AUTO MORE command is invoked, a predefined indicator, which may be a flag set in a communication from the device to the server, is sent by the mobile communication device 100 to the message server 40 at step 395. On receipt of the predefined indicator, the message server 40 will carry out steps to send the further message segments to the mobile communication device 100, without further requests being required from the user of the mobile device 100.

Although in FIG. 4 step 395 is shown as being executed prior to step 405, persons skilled in the art will appreciate that the step may be executed at other points in the process; for example, the predefined indicator may have already been received by the message server 40 prior to receipt of the message at the server 40 (this may be the case if the AUTO MORE command is invoked by default). Alternatively, step 395 may be executed by the mobile communication device 100 after receipt of a message segment at step 405; for example, the indicator may be sent to the message server 40 together with other data acknowledging receipt of the message segment. Preferably, the predefined indicator is communicated to the message server 40 at intervals, or during any other status communication between the mobile communication device 100 and the message server 40. In the preferred embodiment, the message viewer application communicates the predefined indicator to the message server 40. In alternate embodiments, a software module on the mobile communication device 100 may instead be configured to communicate the predefined indicator to the message server 40 based on commands sent between the message viewer application and the software module.

If the message viewer application on the mobile device 100 detects the predetermined delimiter in a received message segment, the AUTO MORE command for that particular message is disabled, and this is communicated to the server 40 at step 415. The message server 40 is thus instructed to cease sending segments of that message to the mobile device 100.

This heuristic is adopted in the preferred embodiment based on the assumption that the viewable content to be received by mobile communications device 100 is contained in the first plaintext portion of the message content. In fact, other portions of the message may contain plaintext portions, or the mobile device may include functionality to permit display of the message content having other encodings. In the preferred embodiment efficiencies are obtained by using the heuristic described. Preferably, the downloading of further message segments is executed by the mobile communication device 100 only when the user is viewing the content downloaded so far of that particular message, in order to reduce memory usage on the mobile device 100. However, in an alternate embodiment, the message viewer application may scan the initial message segments of other messages not currently being viewed by the user and download the remaining displayable portions of those other messages according to the method described above. This embodiment may be less desirable, as it increases the volume of data transmission between the mobile device 100 and the message server 40.

In the preferred embodiment, the potential for perceived delays in the operation of the mobile device is reduced due to the message server 40 halting the automatic forwarding of content to the mobile communication device 100, as described above. Content that is not viewable in the preferred embodiment by the mobile communication device 100 is not automatically forwarded to the device by the message server 40. In the situation where the message comprises signed, encrypted, or signed and encrypted content which is not readily viewable by the message viewer application, some efficiencies may still be realized. The message viewer application, upon recognition of the message as an encrypted message at step 430, may disable the AUTO MORE command at step 415. The user may then optionally manually invoke the AUTO MORE mode in order to download and verify the content of the entire message. Preferably, if the message viewer application recognizes the application as being digitally signed but not encrypted, the message viewer application still receives a further segment 405 if the delimiter or other predefined indicator is not found in the first segment, since the message still contains displayable content besides the digital certificate attached to the message.

Thus, the ability to verify a signed and/or encrypted S/MIME message remains available to the user of the device 100. In this scenario, the message viewer application may alternatively provide a VERIFY command to be manually invoked by the user, which both invokes the AUTO MORE command, and then invokes the verification application after all segments of the signed and/or encrypted message have been downloaded.

It will be appreciated that this approach to the display of secure e-mails will require the user to be familiar with the potential for the received message to have a tentative security status. A received S/MIME message may be accompanied by an indication that the message server 40 has verified the message, but the message may also be indicated to the user to have an indeterminate status as to verification at the mobile device. The user's command to receive further portions of the message (by use of AUTO MORE, for example), if selected, will result in other parts of the message being forwarded to allow the verification process at the mobile device to be carried out. In the meantime, the user experience is enhanced as there is a reduction in response time at the mobile device 100 due to the reduction in non-viewable information being forwarded to the device 100.

Figure 5:
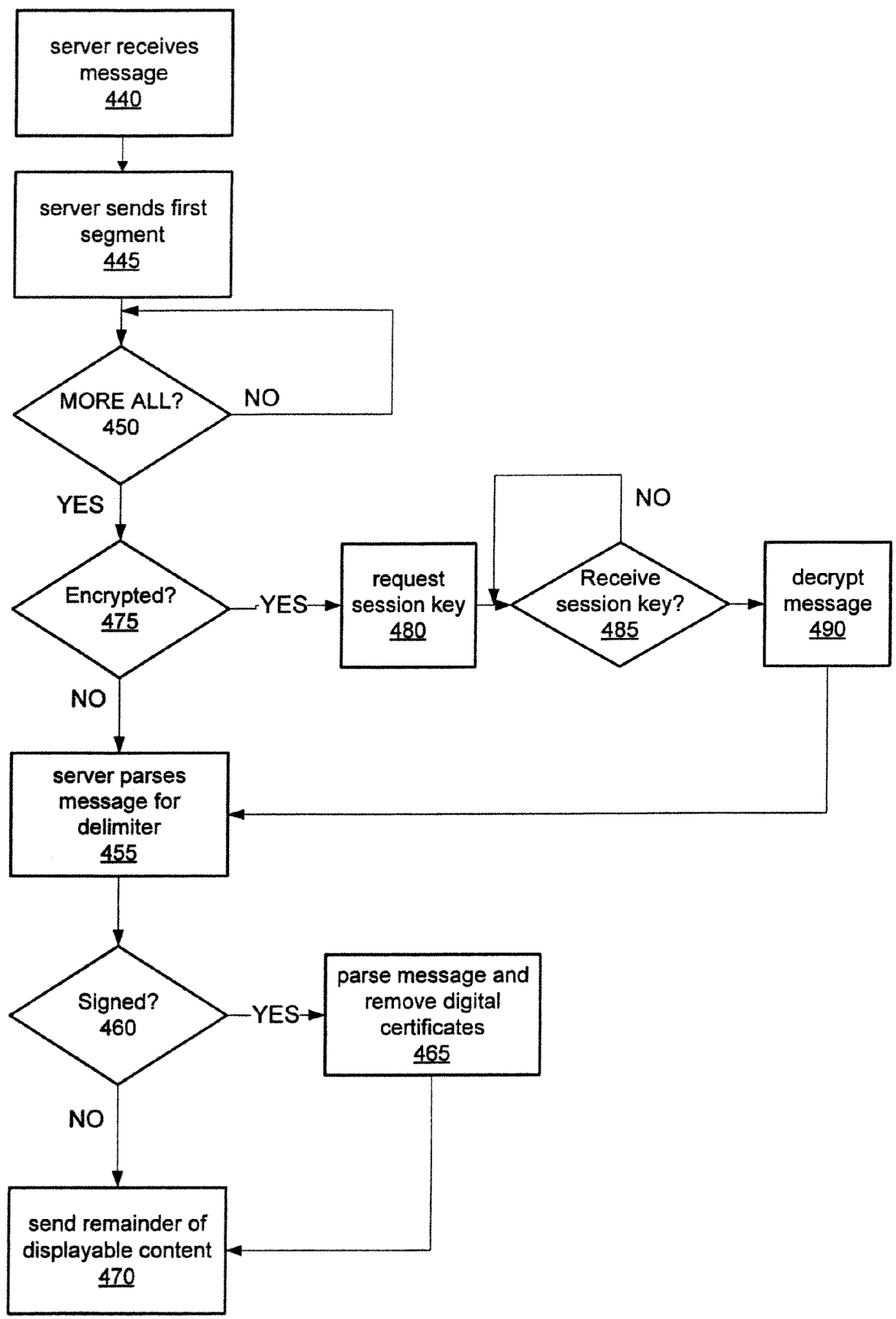
FIG. 5 is a flowchart showing the steps taken by a message server to manage the forwarding of information that may be encrypted to a wireless mobile device.

In a further preferred embodiment, further efficiencies are provided for viewing the displayable portions of a message. Referring to FIG. 5, after the server 40 receives a message for forwarding at step 440, server 40 sends a first segment at step 445. As referred to above, preferably this first segment comprises message content, but in the circumstance where the message is encrypted, the first segment may not comprise any message content unless it is decrypted at the server 40.

If the user of mobile communications device 100 wishes to view the remainder of the displayable portion of the message, the user may send a MORE ALL command to the message server 40. This MORE ALL command may be invoked manually, or it may be set as a default on the mobile communication device 100. If the MORE ALL command is not sent to the message server 40, the steps referred to below will not be carried out by the server of the preferred embodiment. In either case, the mobile device 100 transmits a predetermined indicator to the message server 40 requesting the remainder of the displayable portion of the message. Once the server 40 receives this MORE ALL command (decision branch 450), the server 40 parses the remainder of the message at step 455 in order to identify the end of the portion of the message content comprising content that is displayable to the user on the mobile device 100. This parsing step is generally similar to the step 410 described in the context of the mobile device 100 with respect to each individual segment received at the device 100. However, in this particular embodiment, it is the message server 40 that scans the message for the delimiter or other predefined indicator identifying the end of the displayable (such as plaintext) portion of the message.

As is described in more detail below, once the complete displayable portion of the message is found by identifying the delimiter within the message, the message server 40 then transmits the displayable portion of the message to the mobile device 100. The transmission of the remaining displayable portion of the message may be carried out in a plurality of segments, as described above, or the remainder of the displayable portion may be transmitted as a single, larger segment. However the remainder of the displayable portion of the message is received by the mobile communication device 100, it is the message server 40 that scans the message for the appropriate delimiter, and not the mobile device 100. The transmission of any further segments of the displayable portion of the message by the server 40 is carried out without any further MORE ALL or AUTO MORE commands from the mobile device 100. The MORE ALL and AUTO MORE commands described above may be used concurrently with respect to the same message being viewed on the mobile device 100. While the AUTO MORE command may be invoked by default, and the mobile device 100 may scan each received message segment for the predefined indicator or delimiter indicating the end of the displayable portion of the message, the user may manually intervene and hasten the downloading of the entire viewable content of the message to the mobile device by invoking the MORE ALL command. Preferably, the MORE ALL command is available to be invoked by the user via a menu option or other command keystroke or action in the message viewing application.

In the event that the message received by the message server 40 is digitally signed, encrypted, or both digitally signed and encrypted, some efficiencies may still be realized using the MORE ALL command. If the message is digitally signed (see decision branch 460), then upon receiving the MORE ALL command from the mobile communication device 100, the message server 40 will have parsed the message to identify the displayable content of the message at step 455, but also removes any digital certificates attached to the message (step 465) before transmitting the displayable message content to the mobile device 100 at step 470. If the message is encrypted (or signed and encrypted)(see decision branch 475), then the displayable content within the message may be transmitted to the mobile device 100 pursuant to a MORE ALL command only if the message server 40 receives the session key applicable to the encrypted message from the mobile device 100 first.

FIG. 5 shows steps 480, 485 and 490 which carry out the decryption of the message, if the session key is available. As will be appreciated the server 40 will invoke a time out condition if the session key is not received.

As will be appreciated by those skilled in the art, this reduces the security of the message and is therefore less desirable. However, if the message server 40 is provided with the key and can decrypt the message, the message may then be parsed at step 455 and then the displayable portions transmitted to the mobile device 100 at step 470.

Figure 3:
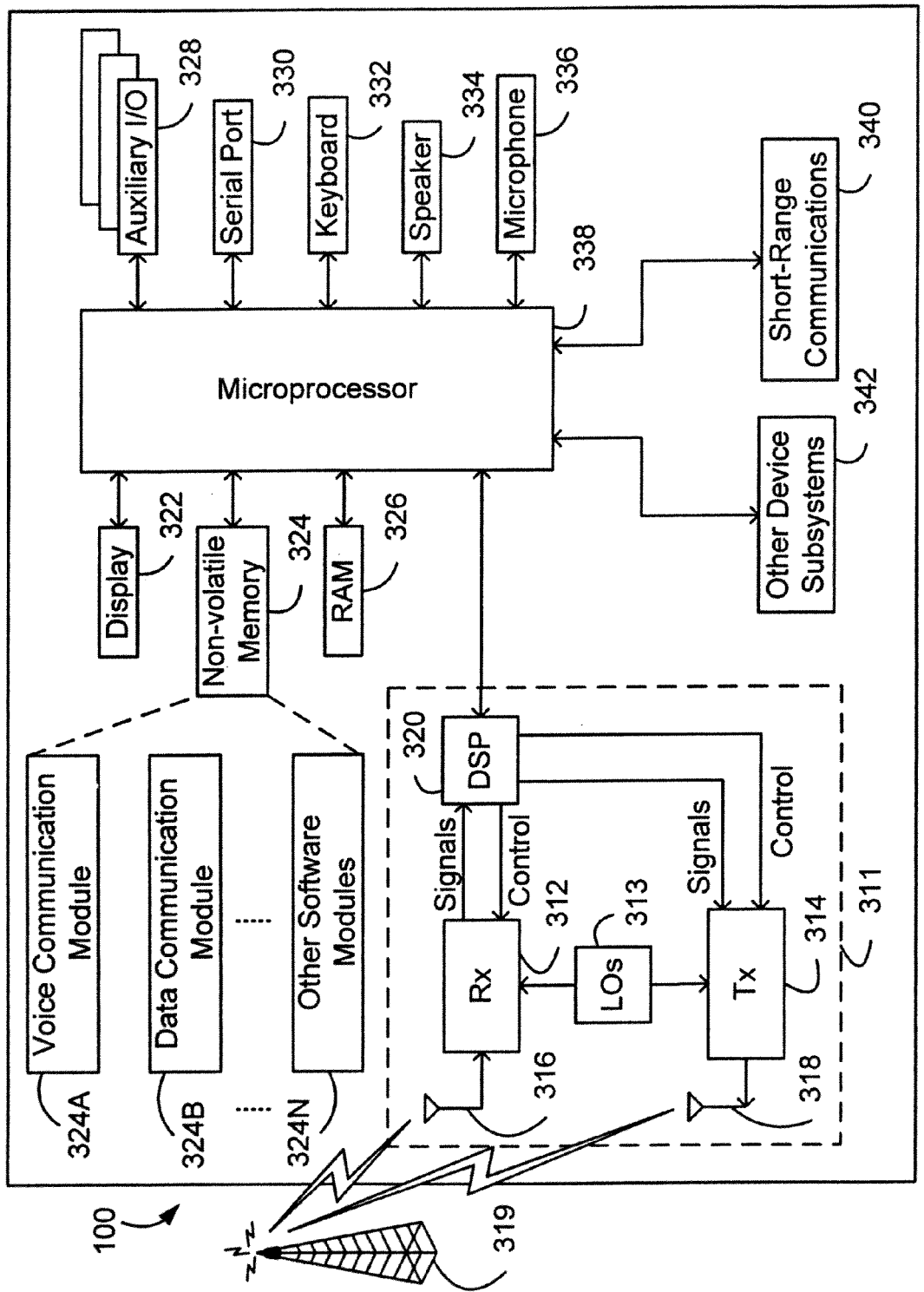
FIG. 3 is a block diagram of a wireless mobile device usable in the example communication system.

As another example, the systems and methods disclosed herein may be used with many different computers and devices, such as a wireless mobile communications device shown in FIG. 3. With reference to FIG. 3, the mobile device 100 is a dual-mode mobile device and includes a transceiver 311, a microprocessor 338, a display 322, non-volatile memory 324, random access memory (RAM) 326, one or more auxiliary input/output (I/O) devices 328, a serial port 330, an input device, such as a keyboard 332, a speaker 334, a microphone 336, a short-range wireless communications sub-system 340, and other device sub-systems 342.

The transceiver 311 includes a receiver 312, a transmitter 314, antennas 316 and 318, one or more local oscillators 313, and a digital signal processor (DSP) 320. The antennas 316 and 318 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 3 by the communication tower 319. These voice and data networks may be separate communication networks using separate infrastructure, such as base stations, network controllers, etc., or they may be integrated into a single wireless network.

The transceiver 311 is used to communicate with the network 319, and includes the receiver 312, the transmitter 314, the one or more local oscillators 313 and the DSP 320. The DSP 320 is used to send and receive signals to and from the transceivers 316 and 318, and also provides control information to the receiver 312 and the transmitter 314. If the voice and data communications occur at a single frequency, or closely-spaced sets of frequencies, then a single local oscillator 313 may be used in conjunction with the receiver 312 and the transmitter 314. Alternatively, if different frequencies are utilized for voice communications versus data communications for example, then a plurality of local oscillators 313 can be used to generate a plurality of frequencies corresponding to the voice and data networks 319. Information, which includes both voice and data information, is communicated to and from the transceiver 311 via a link between the DSP 320 and the microprocessor 338.

The detailed design of the transceiver 311, such as frequency band, component selection, power level, etc., will be dependent upon the communication network 319 in which the mobile device 100 is intended to operate. For example, a mobile device 100 intended to operate in a North American market may include a transceiver 311 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 319, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 319, other than any legally required operations, such as '911' emergency calling.

After any required network registration or activation procedures have been completed, the mobile device 100 may the send and receive communication signals, including both voice and data signals, over the networks 319. Signals received by the antenna 316 from the communication network 319 are routed to the receiver 312, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 320. In a similar manner, signals to be transmitted to the network 319 are processed, including modulation and encoding, for example, by the DSP 320 and are then provided to the transmitter 314 for digital to analog conversion, frequency up conversion, filtering, amplification and transmission to the communication network 319 via the antenna 318.

In addition to processing the communication signals, the DSP 320 also provides for transceiver control. For example, the gain levels applied to communication signals in the receiver 312 and the transmitter 314 may be adaptively controlled through automatic gain control algorithms implemented in the DSP 320. Other transceiver control algorithms could also be implemented in the DSP 320 in order to provide more sophisticated control of the transceiver 311.

The microprocessor 338 preferably manages and controls the overall operation of the mobile device 100. Many types of microprocessors or microcontrollers could be used here, or, alternatively, a single DSP 320 could be used to carry out the functions of the microprocessor 338. Low-level communication functions, including at least data and voice communications, are performed through the DSP 320 in the transceiver 311. Other, high-level communication applications, such as a voice communication application 324A, and a data communication application 324B may be stored in the non-volatile memory 324 for execution by the microprocessor 338. For example, the voice communication module 324A may provide a high-level user interface operable to transmit and receive voice calls between the mobile device 100 and a plurality of other voice or dual-mode devices via the network 319. Similarly, the data communication module 324B may provide a high-level user interface operable for sending and receiving data, such as e-mail messages, files, organizer information, short text messages, etc., between the mobile device 100 and a plurality of other data devices via the networks 319.

The microprocessor 338 also interacts with other device subsystems, such as the display 322, the RAM 326, the auxiliary input/output (I/O) subsystems 328, the serial port 330, the keyboard 332, the speaker 334, the microphone 336, the short-range communications subsystem 340 and any other device subsystems generally designated as 342.

Some of the subsystems shown in FIG. 3 perform communication-related functions, whereas other subsystems may provide "resident" or on-device functions. Notably, some subsystems, such as the keyboard 332 and the display 322 may be used for both communication-related functions, such as entering a text message for transmission over a data communication network, and device-resident functions such as a calculator or task list or other PDA type functions.

Operating system software used by the microprocessor 338 is preferably stored in a persistent store such as non-volatile memory 324. The non-volatile memory 324 may be implemented, for example, as a Flash memory component, or as battery backed-up RAM. In addition to the operating system, which controls low-level functions of the mobile device 310, the non-volatile memory 324 includes a plurality of software modules 324A-324N that can be executed by the microprocessor 338 (and/or the DSP 320), including a voice communication module 324A, a data communication module 324B, and a plurality of other operational modules 324N for carrying out a plurality of other functions. These modules are executed by the microprocessor 338 and provide a high-level interface between a user and the mobile device 100. This interface typically includes a graphical component provided through the display 322, and an input/output component provided through the auxiliary I/O 328, keyboard 332, speaker 334, and microphone 336. The operating system, specific device applications or modules, or parts thereof, may be temporarily loaded into a volatile store, such as RAM 326 for faster operation. Moreover, received communication signals may also be temporarily stored to RAM 326, before permanently writing them to a file system located in a persistent store such as the Flash memory 324.

An exemplary application module 324N that may be loaded onto the mobile device 100 is a personal information manager (PIM) application providing PDA functionality, such as calendar events, appointments, and task items. This module 324N may also interact with the voice communication module 324A for managing phone calls, voice mails, etc., and may also interact with the data communication module for managing e-mail communications and other data transmissions. Alternatively, all of the functionality of the voice communication module 324A and the data communication module 324B may be integrated into the PIM module.

The non-volatile memory 324 preferably also provides a file system to facilitate storage of PIM data items on the device. The PIM application preferably includes the ability to send and receive data items, either by itself, or in conjunction with the voice and data communication modules 324A, 324B, via the wireless networks 319. The PIM data items are preferably seamlessly integrated, synchronized and updated, via the wireless networks 319, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 326. Such information may instead be stored in the non-volatile memory 324, for example, when storage intervals are relatively short, such that the information is removed from memory soon after it is stored. However, storage of this information in the RAM 326 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 330 of the mobile device 100 to the serial port of a computer system or device. The serial port 330 may also be used to enable a user to set preferences through an external device or software application, or to download other application modules 324N for installation. This wired download path may be used to load an encryption key onto the device, which is a more secure method than exchanging encryption information via the wireless network 319. Interfaces for other wired download paths may be provided in the mobile device 100, in addition to or instead of the serial port 330. For example, a USB port would provide an interface to a similarly equipped personal computer.

Additional application modules 324N may be loaded onto the mobile device 100 through the networks 319, through an auxiliary I/O subsystem 328, through the serial port 330, through the short-range communications subsystem 340, or through any other suitable subsystem 342, and installed by a user in the non-volatile memory 324 or RAM 326. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 311 and provided to the microprocessor 338, which preferably further processes the received signal in multiple stages as described above, for eventual output to the display 322, or, alternatively, to an auxiliary I/O device 328. A user of mobile device 100 may also compose data items, such as e-mail messages, using the keyboard 332, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 328, which may include a thumbwheel input device, a touchpad, a variety of switches, a rocker input switch, etc. The composed data items input by the user may then be transmitted over the communication networks 319 via the transceiver module 311.

When the mobile device 100 is operating in a voice communication mode, the overall operation of the mobile device is substantially similar to the data mode, except that received signals are preferably be output to the speaker 334 and voice signals for transmission are generated by a microphone 336. Alternative voice or audio I/O subsystems, such as a voice message recording subsystem, may also be implemented on the mobile device 100. Although voice or audio signal output is preferably accomplished primarily through the speaker 334, the display 322 may also be used to provide an indication of the identity of a calling party, the duration of a voice call, or other voice call related information. For example, the microprocessor 338, in conjunction with the voice communication module and the operating system software, may detect the caller identification information of an incoming voice call and display it on the display 322.

A short-range communications subsystem 340 is also included in the mobile device 100. The subsystem 340 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

Various embodiments of the present invention having been thus described in detail by way of example, it will be apparent to those skilled in the art that variations and modifications may be made without departing from the invention. The invention includes all such variations and modifications as fall within the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

We claim:

1. A mobile device, comprising:
a transceiver configured for wireless communications;
a memory;
a processor in operable communication with the transceiver and the memory, the processor being configured to:
receive, using the transceiver, a first segment of a message, the first segment comprising at least a portion of a displayable message content portion comprised in a body of the message, said displayable message content portion being delimited within the body of the message by a predefined indicator identifying an end of the displayable message content portion;
scan the received first segment for the predefined indicator;
automatically receive, using the transceiver, one or more further segments of the message;
scan said one or more further segments of the message for the predefined indicator until the predefined indicator is found in a received segment; and
automatically transmit, using the transceiver, a command to halt transmission of any further segments of the message once the predefined indicator is found.

2. The mobile device of claim 1, wherein the processor is further configured to automatically transmit, prior to receipt of said one or more further segments, a command to transmit the further segments of the message.

3. The mobile device of claim 2, wherein said command to transmit the further segments is transmitted only if the predefined indicator has not yet been found.

4. The mobile device of claim 1, wherein the processor is configured to scan each further segment prior to receipt of a subsequent further segment.

5. The mobile device of claim 1, wherein at least a portion of the message is displayed at the mobile device while said scanning of the received first segment is carried out.

6. The mobile device of claim 1, wherein the message is not displayed at the mobile device while said scanning of the received first segment is carried out.

7. The mobile device of claim 1, wherein the displayable message content portion comprises one of plaintext, HTML, or RTF formatted content.

8. The mobile device of claim 1, wherein the delimiter comprises an identifier of a content format of the displayable message content portion.

9. The mobile device of claim 1, wherein the message further comprises a non-displayable message content portion, such that the displayable message content portion is located within the message before the non-displayable message content portion.

10. The mobile device of claim 1, wherein the processor is further configured to transmit, using the transceiver, a request for transmission of an entirety of the message.

11. A method, comprising:
receiving at a wireless communication device at least a first segment of a message, wherein the message comprises a plurality of portions of message content, each said portion being delimited by a predefined indicator, and said first segment comprises at least part of a first one of said plurality of portions of message content, said first one of the plurality of portions of message content comprising content displayable at the wireless communication device and being arranged in the message before other ones of the plurality of portions of message content;
if said first segment is determined to comprise an entirety of the first one of said plurality of portions of message content thus delimited, halting receipt of further segments of the message; and
if said first segment is determined not to comprise said entirety, continuing to receive further segments of the message at the wireless communication device until said entirety is determined to have been received at the wireless communication device.

12. The method of claim 11, further comprising scanning said first segment for the predefined indicator corresponding to said first one of the plurality of portions of message content to determine whether said first segment comprises said entirety.

13. The method of claim 11, wherein said halting receipt of further segments comprises transmitting a command to halt transmission of further segments to the wireless communication device.

14. The method of claim 11, wherein said content displayable at the wireless communication device comprises one of plaintext, HTML, or RTF formatted content.

15. The method of claim 11, further comprising determining from said first segment that the message is encrypted, and automatically requesting a remainder of the message for receipt at the wireless communication device.

16. A mobile device, comprising:
a transceiver configured for wireless communications;
a memory;
a processor in operable communication with the transceiver and the memory, the processor being configured to:
receive, using the transceiver, at least a first segment of a message, wherein the message comprises a plurality of portions of message content, each said portion being delimited by a predefined indicator, and said first segment comprises at least part of a first one of said plurality of portions of message content, said first one of the plurality of portions of message content comprising content displayable at the mobile device and being arranged in the message before other ones of the plurality of portions of message content;
if said first segment is determined to comprise an entirety of the first one of said plurality of portions of message content thus delimited, halt receipt of further segments of the message; and
if said first segment is determined not to comprise said entirety, continuing to receive, using the transceiver, further segments of the message until said entirety is determined to have been received.

17. The mobile device of claim 16, wherein the processor is further configured to scan said first segment for the predefined indicator corresponding to said first one of the plurality of portions of message content to determine whether said first segment comprises said entirety.

18. The mobile device of claim 16, wherein the processor is configured to halt said receipt by transmitting, using the transceiver, a command to halt transmission of further segments to the mobile device.

19. The mobile device of claim 16, wherein said content displayable at the mobile device comprises one of plaintext, HTML, or RTF formatted content.

20. The mobile device of claim 16, wherein the processor is further configured to determine from said first segment that the message is encrypted, and to automatically request, using the transceiver, a remainder of the message for receipt at the mobile device.

21. A method, comprising:
receiving at a wireless communication device at least a first segment of a message, wherein the message comprises a plurality of portions of message content, each said portion being delimited by a predefined indicator, and said first segment comprises at least part of a first one of said plurality of portions of message content, said first one of the plurality of portions of message content comprising content displayable at the wireless communication device, said content displayable at the wireless communication device comprising one of plaintext, HTML, or RTF formatted content;
if said first segment is determined to comprise an entirety of the first one of said plurality of portions of message content thus delimited, halting receipt of further segments of the message; and
if said first segment is determined not to comprise said entirety, continuing to receive further segments of the message at the wireless communication device until said entirety is determined to have been received at the wireless communication device.

22. A mobile device, comprising:
a transceiver configured for wireless communications;
a memory;
a processor in operable communication with the transceiver and the memory, the processor being configured to:
receive, using the transceiver, at least a first segment of a message, wherein the message comprises a plurality of portions of message content, each said portion being delimited by a predefined indicator, and said first segment comprises at least part of a first one of said plurality of portions of message content, said first one of the plurality of portions of message content comprising content displayable at the mobile device, said content displayable at the wireless communication device comprising one of plaintext, HTML, or RTF formatted content;
if said first segment is determined to comprise an entirety of the first one of said plurality of portions of message content thus delimited, halt receipt of further segments of the message; and
if said first segment is determined not to comprise said entirety, continuing to receive, using the transceiver, further segments of the message until said entirety is determined to have been received.

* * * * *